US009876929B2

(12) United States Patent
Yamaguchi

(10) Patent No.: US 9,876,929 B2
(45) Date of Patent: Jan. 23, 2018

(54) IMAGE OUTPUT DEVICE, IMAGE OUTPUT SYSTEM, MOBILE INFORMATION PROCESSING DEVICE, IMAGE OUTPUT METHOD, AND NON-TRANSITORY COMPUTER READABLE MEDIUM

(71) Applicant: FUJI XEROX CO., LTD., Tokyo (JP)

(72) Inventor: Hiroshi Yamaguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/217,072

(22) Filed: Jul. 22, 2016

(65) Prior Publication Data
US 2017/0195512 A1 Jul. 6, 2017

(30) Foreign Application Priority Data

Jan. 5, 2016 (JP) .................................. 2016-000501
Jan. 19, 2016 (JP) .................................. 2016-007774

(51) Int. Cl.
*H04N 1/32* (2006.01)
*G06K 9/00* (2006.01)
*H04N 1/00* (2006.01)
*H04B 1/3827* (2015.01)
*H04B 10/116* (2013.01)

(52) U.S. Cl.
CPC ..... *H04N 1/32101* (2013.01); *G06K 9/00362* (2013.01); *H04B 1/3833* (2013.01); *H04B 10/116* (2013.01); *H04N 1/00307* (2013.01); *H04N 2201/0053* (2013.01); *H04N 2201/0094* (2013.01)

(58) Field of Classification Search
CPC .......... H04N 1/32101; H04N 1/00307; H04N 2201/0053; H04N 2201/0094; G06K 9/00362; H04B 1/3833; H04B 10/116
USPC ....................................................... 358/1.15
See application file for complete search history.

(56) References Cited

U.S. PATENT DOCUMENTS

| 2008/0113618 | A1* | 5/2008 | De Leon | H04W 12/04 455/41.2 |
|---|---|---|---|---|
| 2008/0192289 | A1* | 8/2008 | Honda | G06F 21/608 358/1.15 |
| 2009/0278799 | A1* | 11/2009 | Wilson | G06F 3/0304 345/158 |
| 2014/0218765 | A1 | 8/2014 | Sawayanagi et al. | |

(Continued)

FOREIGN PATENT DOCUMENTS

JP 2007-189348 A 7/2007
JP 2014-007624 A 1/2014

(Continued)

*Primary Examiner* — Allen H Nguyen
(74) *Attorney, Agent, or Firm* — Sughrue Mion, PLLC

(57) ABSTRACT

An image output device includes a transmitting unit and a receiving unit. The transmitting unit transmits, via visible-light communication, information for identifying the image output device as a destination of second communication different from the visible-light communication. The receiving unit receives a print instruction from a mobile information processing device via the second communication in accordance with the information. The transmitting unit stops emission of light for the visible-light communication in response to receipt of the print instruction by the receiving unit.

11 Claims, 17 Drawing Sheets

(56) References Cited

U.S. PATENT DOCUMENTS

| | | | |
|---|---|---|---|
| 2014/0232903 A1* | 8/2014 | Oshima | H04N 5/3532 |
| | | | 348/229.1 |
| 2015/0186088 A1 | 7/2015 | Iwashima | |
| 2016/0099774 A1* | 4/2016 | Sim | H04B 10/116 |
| | | | 398/115 |

FOREIGN PATENT DOCUMENTS

| | | |
|---|---|---|
| JP | 2014-150474 A | 8/2014 |
| JP | 2014-180792 A | 9/2014 |
| JP | 2015-126504 A | 7/2015 |

* cited by examiner

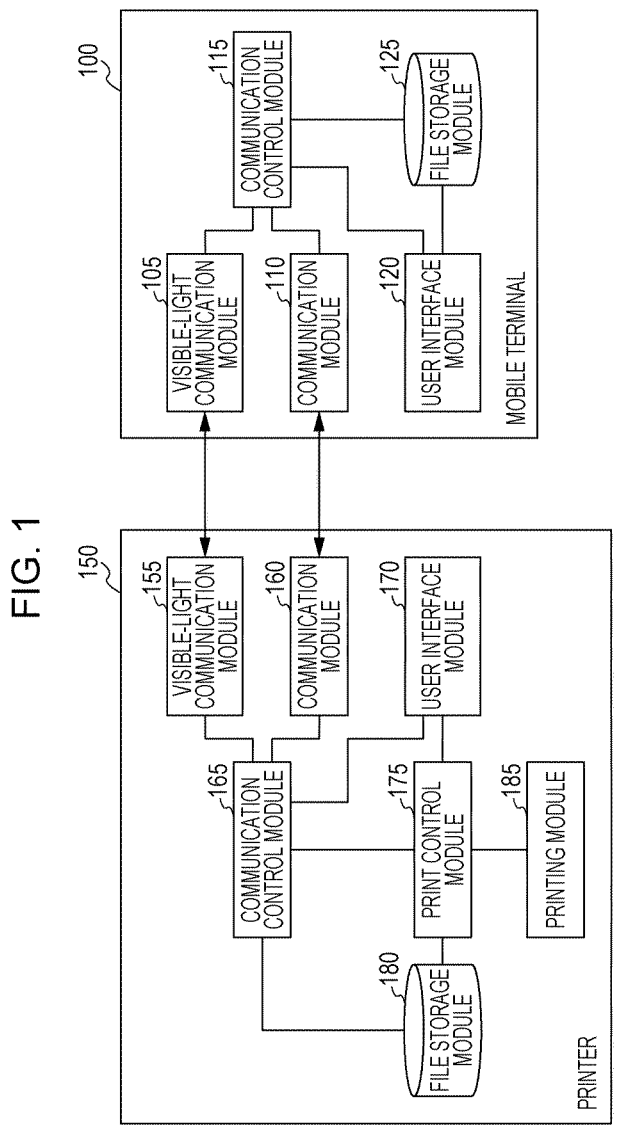

FIG. 2A
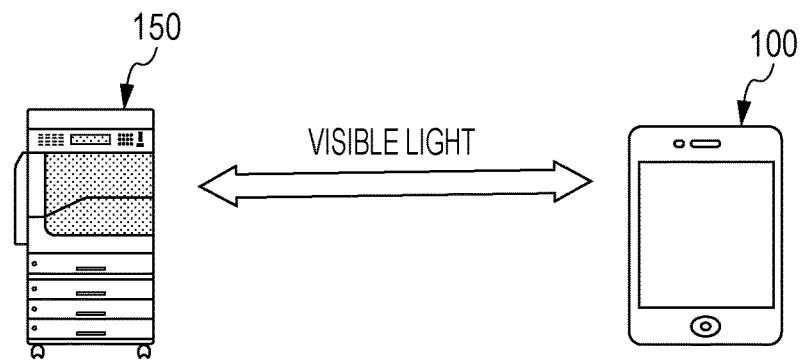
FIG. 2B1
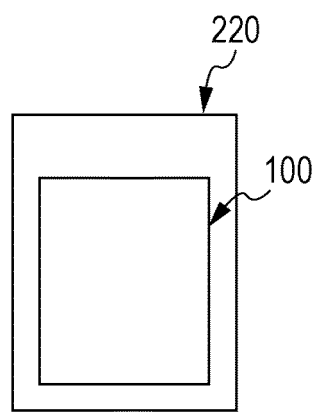
FIG. 2B2
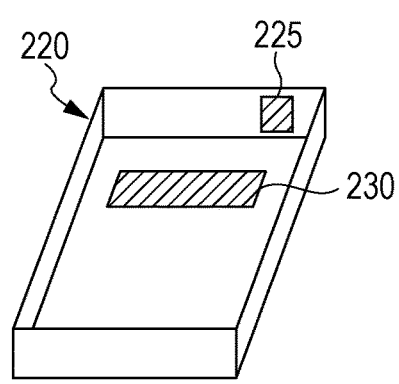
FIG. 2B3
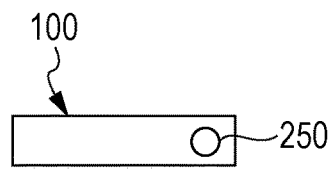
FIG. 2B4
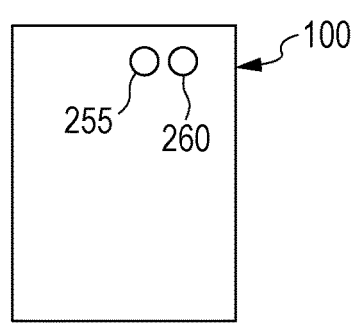

IMAGE OUTPUT DEVICE, IMAGE OUTPUT SYSTEM, MOBILE INFORMATION PROCESSING DEVICE, IMAGE OUTPUT METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-000501 filed Jan. 5, 2016 and Japanese Patent Application No. 2016-007774 filed Jan. 19, 2016.

BACKGROUND (i) Technical Field

The present invention relates to an image output device, an image output system, a mobile information processing device, an image output method, and a non-transitory computer readable medium.

(ii) Related Art

It is common to issue a print instruction from a mobile information processing device and to perform printing by using an image output device.

However, it is not common to communicate information for identifying the image output device via visible-light communication.

SUMMARY

According to an aspect of the invention, there is provided an image output device including a transmitting unit and a receiving unit. The transmitting unit transmits, via visible-light communication, information for identifying the image output device as a destination of second communication different from the visible-light communication. The receiving unit receives a print instruction from a mobile information processing device via the second communication in accordance with the information. The transmitting unit stops emission of light for the visible-light communication in response to receipt of the print instruction by the receiving unit.

BRIEF DESCRIPTION OF THE DRAWINGS

An exemplary embodiment of the present invention will be described in detail based on the following figures, wherein:

FIG. 1 is a conceptual module configuration diagram of an example configuration of an exemplary embodiment;

FIGS. 2A and 2B1 through 2B4 illustrate an example configuration of a system according to the exemplary embodiment;

FIG. 4 is a flowchart illustrating the example process according to the exemplary embodiment;

DETAILED DESCRIPTION

Figure 3:
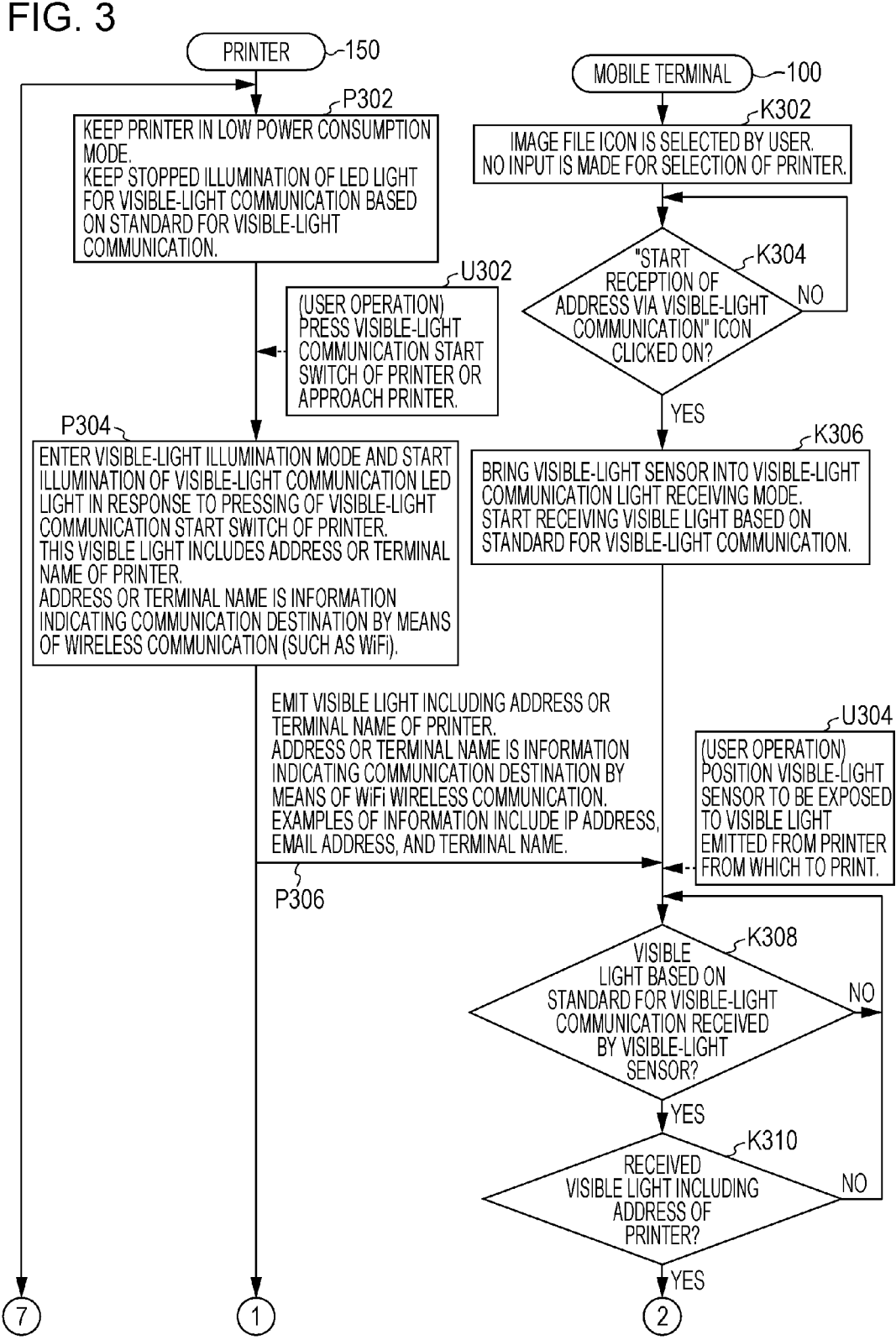
FIG. 3 is a flowchart illustrating an example process according to the exemplary embodiment.

An exemplary embodiment of the present invention will be described hereinafter with reference to the drawings.

FIG. 1 is a conceptual module configuration diagram illustrating an example configuration of this exemplary embodiment.

The term "module" generally refers to a logically separable component such as software (computer program) or hardware. Thus, each module in this exemplary embodiment refers not only to a module in a computer program but also to a module in a hardware configuration. Accordingly, this exemplary embodiment is also directed to a computer program for causing a computer to function as these modules (i.e., a program for causing the computer to execute the respective procedures, a program for causing the computer to function as the respective units, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or multiple modules may be constituted by a single program in actual implementation. Conversely, a single module may be constituted by multiple programs. In addition, multiple modules may be executed by a single computer, or a single module may be executed by multiple computers in a distributed or parallel environment. As an alternative, a single module may include another module. In the following, the term "connection" refers not only to a physical connection but also to a logical connection (such as exchanging of data, sending instructions, and a reference relationship between data). The term "predetermined" refers to a state in which certain information is determined before intended processing is to be performed, and is used to include a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there are multiple "predetermined values", the values may be different or two or more (or all) of the values may be identical. A description having a meaning of "if A, then B" is used to mean: "it is determined whether or not A, and B if it is determined that A" unless the determination of whether or not A is required.

Furthermore, the term "system" or "device" is used to include a configuration in which multiple computers, hardware components, devices, or other suitable elements are connected to each other via a communication medium such as a network (including one-to-one communication connections), and what is implemented by a single computer, hardware component, device, or suitable element. The terms "device" and "system" are used synonymously. It is to be understood that the term "system" does not include what is merely a social "mechanism" (social system), which is a kind of artificial arrangement.

Moreover, target information is read from a storage device for each processing operation that is to be performed by an individual module or, if multiple processing operations are to be performed within a module, for each of the multiple processing operations. After the processing is performed, the result of the processing is written to the storage device. Thus, the reading of information from the storage device before the processing of the information is to be performed and the writing of information to the storage device after the processing of the information has been performed may not be described. Examples of the storage device used here may include a hard disk, a random access memory (RAM), an external storage medium, a storage device connected via a communication line, and a register within a central processing unit (CPU).

This exemplary embodiment illustrates a configuration including a mobile terminal 100 and a printer 150. The mobile terminal 100 issues a print instruction (also referred to as "print job") to the printer 150. The printer 150 performs printing upon receipt of a print instruction from the mobile terminal 100. For example, in a setting in which a user temporarily uses the printer 150 (such as in the case where the user uses the printer 150 one time in a location during a business trip), it may be bothersome for the user to set settings for establishing communication between the mobile terminal 100 and the printer 150. This exemplary embodiment may enable the user to give, even in this case, a print instruction by using their mobile terminal 100, without causing the user to perform a communication setting operation (without causing the user to at least select the printer 150 as the destination of the print instruction) to perform printing by using the printer 150.

Visible-light communication is employed as communication between the mobile terminal 100 and the printer 150 (in particular, communication from the printer 150 to the mobile terminal 100).

Visible-light communication is communication that uses visible light emitted from an illumination source such as a light-emitting diode (LED) and modulated by changing the intensity of the visible light. The following are examples of standards for visible-light communication.

JEITA CP-1221/1222/1223 (Japan Electronics and Information Technology Industries Association)

These standards are used principally for illumination-light communication with 4.8 kbps each way.

JEITA CP-1221 Visible Light Communications System, March 2007 http://www.jeita.or.jp/japanese/standard/book/CP-1221

JEITA CP-1222 Visible Light ID System, June 2007 http://www.jeita.or.jp/japanese/standard/book/CP-1222

JEITA CP-1223 Visible Light Beacon System, May 2013 http://www.jeita.or.jp/japanese/standard/book/CP-1223

The standards listed above provide various applications, such as identifying an object, providing position information, and establishing various guidance systems, by causing a visible light source to transmit via radiation brief information or ID information specific to the visible light source.

ARIB STD-T50 Ver. 4.0 (Association of Radio Industries and Businesses), December 2009

This standard is that for optical local area network (LAN) (visible-light extension of infrared light LAN) that uses visible light for downlink and infrared light for uplink.

http://www.arib.or.jp/english/html/overview/doc/1-STD-T50v4_0.pdf

IrDA "Visible Light Communication Standard" Ver. 1.0 (the joint cooperative agreement between the Visible Light Communications Consortium (VLCC) and the Infrared Data Association (IrDA)), February 2009

This standard is that which is an extension to and compatible with IrDA visible-light communication technology.

Institute of Electrical and Electronics Engineers (IEEE) 802.15.7 (January 2009)

This standard is a visible light communication standard that has been released.

IEEE 802.15.SG7a

This standard is a visible light communication standard that uses image sensors.

The printer 150 emits light for visible-light communication to the mobile terminal 100, and transmits to the mobile terminal 100 information for identifying the printer 150 to establish communication with the printer 150. The term "communication" in the phrase "to establish communication with the printer 150", as used herein, refers to communication, other than visible-light communication, that requires information for identifying a destination of the communication. For example, wireless communication such as that via WiFi (Wireless Fidelity) or Bluetooth (registered trademark), which is a standard for short-range wireless communication, may be used. The term "information for identifying the printer 150" refers to information for identifying the other end of communication (such as pairing), and the information generally includes the name, address, and the like of the device, specific examples of which include an Internet protocol (IP) address, a Media Access Control address (MAC address), an email address, and a terminal name.

The mobile terminal 100 receives the information (i.e., the information for identifying the printer 150 to establish communication with the printer 150) from the printer 150 via visible-light communication.

Then, the mobile terminal 100 performs the setting of communication (i.e., communication, other than visible-light communication, that is set by using the information) in accordance with the information, and transmits a print instruction to the printer 150 by using the communication.

The printer 150 receives the print instruction from the mobile terminal 100 via the communication, and performs printing in accordance with the print instruction.

The series of processes described above does not involve an operation of selecting the destination of the print instruction by using the mobile terminal 100.

As in the example illustrated in FIG. 1, the mobile terminal 100 includes a visible-light communication module 105, a communication module 110, a communication control module 115, a user interface module 120, and a file storage module 125. The mobile terminal 100 is typically a portable device, examples of which include mobile phones (including smartphones), notebook personal computers (PCs), and wearable terminals (e.g., wristwatch-type terminals and glasses-type terminals). The mobile terminal 100 is capable of visible-light communication (at least visible-light communication for transmission), and is designed to transmit a print instruction to the printer 150 in accordance with a user operation.

The visible-light communication module 105 is connected to the communication control module 115. The visible-light communication module 105 performs visible-light communication (receives and emits light for visible-light communication). The visible-light communication module 105 receives information for identifying the printer 150 to establish communication with the printer 150 via visible-light communication. The information is passed to the communication control module 115.

The visible-light communication module 105 may be oriented in the same direction as that of a camera included in the mobile terminal 100. In this case, an image captured with the camera may be displayed on a display of the user interface module 120 to allow the user to check the other end of the visible-light communication (i.e., the printer 150).

The communication module 110 is connected to the communication control module 115. The communication module 110 performs communication (communication other than visible-light communication) with the printer 150. The communication module 110 is controlled by the communication control module 115 to transmit a print instruction to the printer 150 via the communication in accordance with the information received by the visible-light communication module 105.

The communication control module 115 is connected to the visible-light communication module 105, the communication module 110, the user interface module 120, and the file storage module 125. The communication control module 115 receives the information for identifying the printer 150 to establish communication with the printer 150 through the visible-light communication module 105 via visible-light communication. The communication control module 115 then controls the communication module 110 to transmit a print instruction to the printer 150 via the communication in accordance with the information. Visible light communication allows the source from which the visible light communication originates (e.g., the printer 150), the destination at which the visible light communication is received (e.g., the mobile terminal 100), and a communication path to be visible to the user, facilitating the user's understanding of the communication range.

In addition, the communication control module 115 may control the communication module 110 to transmit a print instruction to the printer 150 without accepting an operation input of the user for selecting the printer 150, which is the destination of the print instruction.

The communication control module 115 may further control the visible-light communication module 105 to transmit an instruction for transmitting the information for identifying the printer 150. The instruction for transmitting the information for identifying the printer 150 is an instruction given by the mobile terminal 100 to request information necessary to start communication with the printer 150.

The communication control module 115 may also control the visible-light communication module 105 to stop receiving visible-light communication if the "information for identifying the printer 150" has been received. The reason for this is to stop further receipt of the "information for identifying the printer 150".

In addition, when the visible-light communication module 105 receives the characteristics or state of the printer 150 from the printer 150 via visible-light communication, the communication control module 115 may generate a print instruction in accordance with the received characteristics or state. Then, the communication control module 115 may control the communication module 110 to transmit the generated print instruction.

The communication control module 115 may further control the communication module 110 to transmit "information indicating that the communication is being performed after receipt of the information for identifying the printer 150 via visible-light communication", together with the print instruction, to the printer 150.

The user interface module 120 is connected to the communication control module 115 and the file storage module 125. The user interface module 120 accepts a user operation made via a touch screen, audio, a line of sight, a gesture, a mouse, a keyboard, or the like. Examples of the user operation include giving a print instruction. Further, the user interface module 120 informs the user of information by using a device such as a liquid crystal display, a speaker, or a vibrator. Upon receipt of information indicating receipt of the print instruction from the printer 150, the user interface module 120 may present the information. The user, who is presented with the information, performs an operation of stopping the visible-light communication (such as stopping reception of light for visible-light communication or positioning the mobile terminal 100 to prevent visible-light communication light from reaching a visible-light sensor (or light-receiving sensor) of the mobile terminal 100).

The user interface module 120 may provide a suggestion to the user to perform an operation of positioning the mobile terminal 100 to allow visible light to reach the mobile terminal 100 (or to keep the mobile terminal 100 in position to allow visible light to reach the mobile terminal 100) when the "information for identifying the printer 150" is being received via visible-light communication. This facilitates the user's understanding of the operation to be performed when receiving the information for identifying the printer 150 via visible-light communication.

The file storage module 125 is connected to the communication control module 115 and the user interface module 120. The file storage module 125 stores a file to be printed. The communication control module 115 may create a print instruction including a file to be printed.

As in the example illustrated in FIG. 1, the printer 150 includes a visible-light communication module 155, a communication module 160, a communication control module 165, a user interface module 170, a print control module 175, a file storage module 180, and a printing module 185. The printer 150 may be typically a printer or a device having a printer function, such as a multifunction device (an image processing device having two or more of functions such as scanner, printer, copier, and facsimile functions).

The visible-light communication module 155 is connected to the communication control module 165. The visible-light communication module 155 performs visible-light communication with (i.e., receives and emits light for visible-light communication from and to) the mobile terminal 100. The visible-light communication module 155 transmits information for identifying the printer 150 to establish communication with the printer 150 to the mobile terminal 100 via visible-light communication.

The communication module 160 is connected to the communication control module 165. The communication module 160 performs communication (communication other than visible-light communication) with the mobile terminal 100. The communication module 160 receives a print instruction from the mobile terminal 100 via the communication. The print instruction is passed to the communication control module 165.

The communication control module 165 is connected to the visible-light communication module 155, the communication module 160, the user interface module 170, the print control module 175, and the file storage module 180. The communication control module 165 controls the visible-light communication module 155 to transmit the "information for identifying the printer 150" to the mobile terminal 100 via visible-light communication. Thereafter, a print instruction is received from the mobile terminal 100 through the communication module 160.

The communication control module 165 may transmit the "information for identifying the printer 150" multiple times to reduce the risk of commencing reception via visible-light communication without successfully receiving the header portion of a print instruction. That is, in some cases, visible-light communication might commence prior to positioning the mobile terminal 100 to allow visible light to reach the visible-light sensor of the mobile terminal 100.

In a case where the printer 150 transmits the "information for identifying the printer 150" multiple times, the communication control module 115 of the mobile terminal 100 determines whether or not the currently received information is identical to the previously received information. If both pieces of information are identical, the currently received information may be discarded.

The printer 150 may further include a human sensor that detects a person. The communication control module 165 may control the visible-light communication module 155 to start visible-light communication when the human sensor detects a person. The term "detect a person", as used here, is used to include detecting a person who is approaching the printer 150. Examples of the human sensor include an infrared sensor, an ultrasonic sensor, and a visible light sensor. A combination of them, for example, a combination of an infrared sensor and an ultrasonic sensor, may be used or an infrared sensor or the like alone may be used.

The communication control module 165 may control the visible-light communication module 155 so that the printer 150 starts visible-light communication in response to receipt of an instruction for transmitting the information for identifying the printer 150 from the mobile terminal 100 via visible-light communication.

The communication control module 165 may also control the visible-light communication module 155 to stop emitting light for visible-light communication in response to the communication module 160 receiving a print instruction. The reason for this is to stop further transmission of the "information for identifying the printer 150". The term "in response of the communication module 160 receiving a print instruction" may refer to when the reception of all the data constituting the print instruction is completed or when it is determined that the print instruction has been received.

The communication control module 165 may also control the visible-light communication module 155 to transmit the characteristics or state of the printer 150 via visible-light communication. For example, the characteristics of the printer 150 may include an available sheet size, the resolution, the availability of color or monochrome printing, and the availability of simplex or duplex printing. Examples of the state of the printer 150 include a printer-ready state, a printer-error state, and a paper-out state.

Further, in response to receipt of, together with a print instruction, "information indicating that the communication is being performed after receipt of the information for identifying the printer 150 via visible-light communication" together with a print instruction, the communication control module 165 may perform control to perform printing in accordance with the print instruction. The reason for this is to make distinction between receipt of the print instruction after visible-light communication has been performed and receipt of the print instruction without visible-light communication having been performed. If no print instruction has been received, the communication control module 165 performs control to, for example, put the printer 150 on standby until a print instruction has been received.

The user interface module 170 is connected to the communication control module 165 and the print control module 175. The user interface module 170 accepts a user operation made via a touch screen, audio, a line of sight, a gesture, a mouse, a keyboard, or the like. Further, the user interface module 170 informs the user of information by using a device such as a liquid crystal display, a speaker, or a vibrator.

The print control module 175 is connected to the communication control module 165, the user interface module 170, the file storage module 180, and the printing module 185. The print control module 175 controls the printing module 185 to perform a printing process in accordance with the print instruction received by the communication control module 165.

The file storage module 180 is connected to the communication control module 165 and the print control module 175. The file storage module 180 stores a file included in the print instruction received by the communication control module 165.

The user interface module 170 may provide a suggestion to the user to perform an operation of positioning the mobile terminal 100 to allow visible light to reach the mobile terminal 100 when transmission is to be performed via visible-light communication. This facilitates the user's understanding of the operation to be performed when transmission is performed via visible-light communication.

The printing module 185 is connected to the print control module 175. The printing module 185 performs a printing process in accordance with control of the print control module 175.

FIGS. 2A and 2B1 through 2B4 illustrate an example configuration and so on of a system according to this exemplary embodiment.

As in the example illustrated in FIG. 2A, visible-light communication is established between the mobile terminal 100 and the printer 150. For example, the mobile terminal 100 receives visible-light communication light from the printer 150 to receive "information for identifying the printer 150". The mobile terminal 100 then sets the "information for identifying the printer 150" to enable communication with the printer 150. As described above, the communication to be enabled is communication other than visible-light communication. The mobile terminal 100 transmits a print instruction to the printer 150 by using the communication. The printer 150 prints a file transmitted from the mobile terminal 100. The user extracts a printed sheet from the printer 150.

A visible-light communication device of the printer 150 is mounted in an area (for example, a front surface portion or a top surface portion) onto which an external device (e.g., the mobile terminal 100) is capable of projecting light.

In the example illustrated in FIG. 2A, the mobile terminal 100 and the printer 150 are kept apart from each other. The mobile terminal 100 and the printer 150 may be placed close to each other if visible-light communication is possible therebetween. For example, as illustrated in FIG. 2B1, the printer 150 may have in a top surface portion thereof a mobile terminal seat 220 for accommodating the mobile terminal 100.

For example, as illustrated in FIG. 2B2, the mobile terminal seat 220 may include a visible-light communication device 225 on an upper side surface thereof. The mobile terminal seat 220 may further include a visible-light communication device 230 on a bottom surface thereof. The visible-light communication device 225 may be defined over the entirety of the upper side surface of the mobile terminal seat 220. The visible-light communication device 230 may be defined over the entirety of the bottom surface of the mobile terminal seat 220. The visible-light communication device 225 (the visible-light communication device 230) may be defined on the upper side surface, the right side surface, the left side surface, the lower side surface, or the bottom surface, or may be defined over the entirety thereof. The visible-light communication device 225 (the visible-light communication device 230) may be defined so as to match the position of a visible-light communication device of the mobile terminal 100.

Alternatively, the visible-light communication device 225 (the visible-light communication device 230) may be defined on the entirety (the upper side surface, the lower side surface, the right side surface, the left side surface, and the bottom surface) of the mobile terminal seat 220 in order to support the mobile terminal 100 regardless of how the mobile terminal 100 is placed or the type of the mobile terminal 100.

Figure 4:
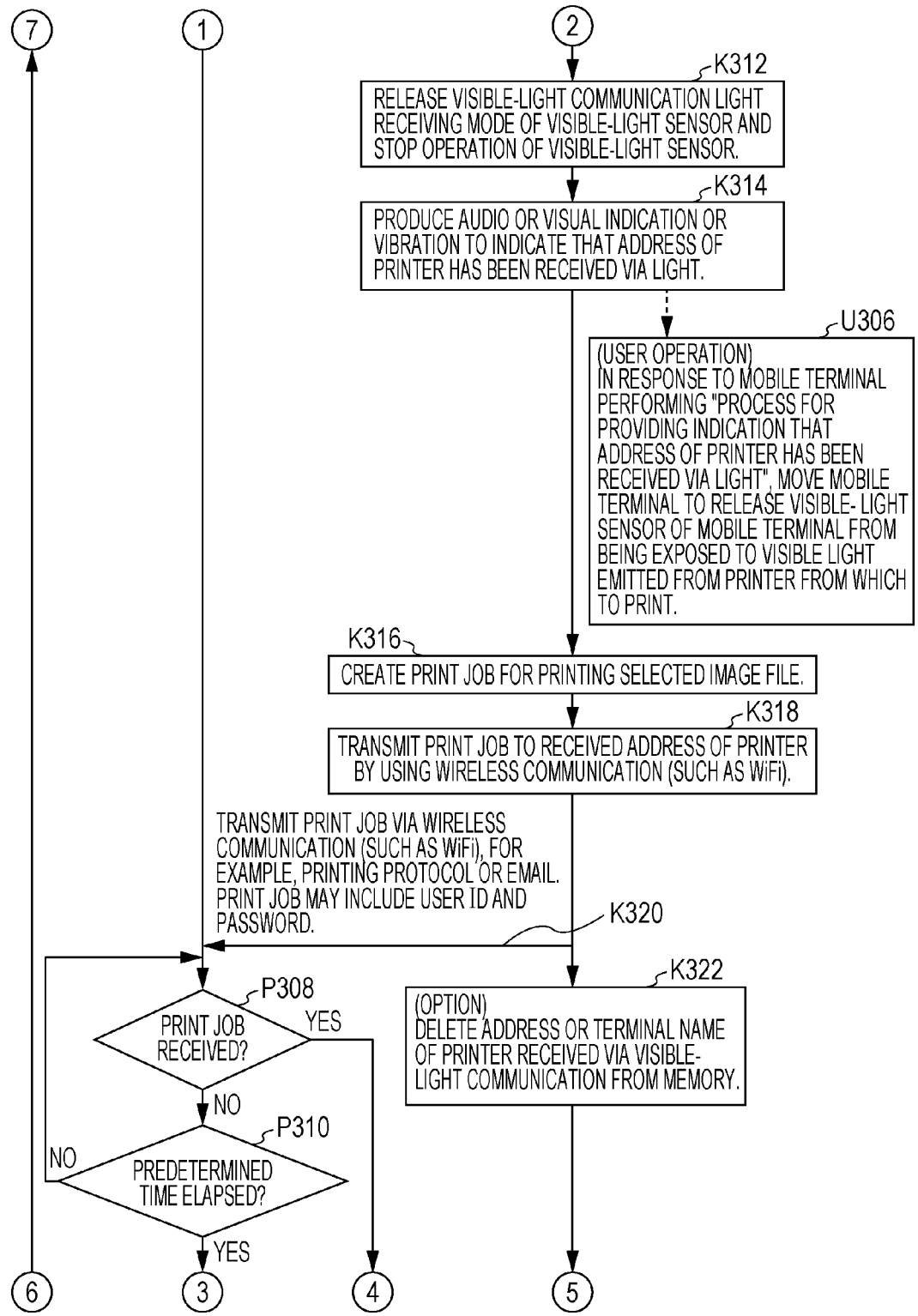

As in the example illustrated in FIG. 2B3, the mobile terminal 100 may include a visible-light communication device 250 on a side surface thereof. As in the example illustrated in FIG. 2B4, the mobile terminal 100 may further include a visible-light communication device 255 near a camera 260. In this case, as described above, an image of an entity at the other end of visible-light communication (i.e., the printer 150) is captured with the camera 260 and is displayed on a display of the mobile terminal 100 to allow the user to check the entity at the other end of the communication. The camera 260 may have the function of the visible-light communication device (a light-receiving sensor, a light-emitting device, or a combination of them) 255. In this case, it will be understood that the visible-light communication device 255 in the example illustrated in FIG. 2B4 is not necessary and only the camera 260 is provided. Additionally, a strobe light, a display, or the like mounted on the mobile terminal 100 may be used as a light-emitting device for use in visible-light communication.

Figure 5:
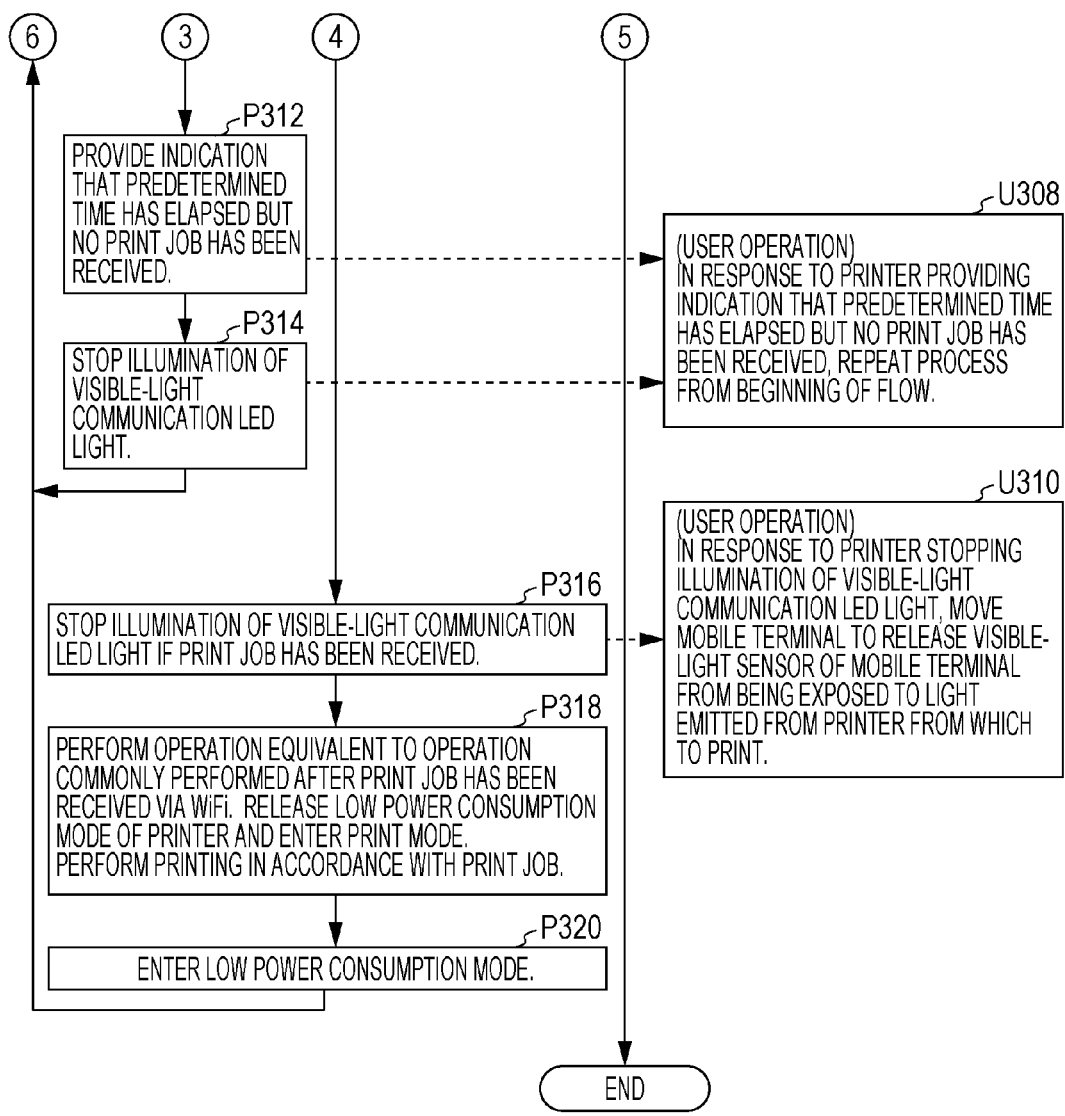
FIG. 5 is a flowchart illustrating the example process according to the exemplary embodiment.

FIGS. 3 to 5 are a flowchart illustrating an example process according to this exemplary embodiment.

The printer 150 performs the following process. The operation of the user will also be described using steps U.

In step P302, the printer 150 is kept in a low power consumption mode. The printer 150 keeps stopped illumination of an LED light thereof for visible-light communication (hereinafter referred to as "visible-light communication LED light") based on the standard for visible-light communication.

In step U302, a user operation is performed as follows. The user presses a visible-light communication start switch of the printer 150 or approaches the printer 150.

In step P304, the printer 150 enters a visible-light illumination mode and starts the illumination of the visible-light communication LED light when the visible-light communication start switch of the printer 150 is pressed. The visible light includes the address or terminal name of the printer 150. The address or terminal name is information indicating a communication destination by means of wireless communication (such as WiFi). In step P304, the LED light may be caused to illuminate only when visible-light communication is required (e.g., when the switch is pressed) to reduce power consumption.

In step P306, the printer 150 communicates with the mobile terminal 100 by emitting visible light including the address or terminal name of the printer 150. The address or terminal name is information indicating a communication destination by means of WiFi wireless communication. Examples of the information include an IP address, an email address, and a terminal name.

In step P308, the printer 150 determines whether or not a print job has been received. If a print job has been received, the process proceeds to step P316. Otherwise, the process proceeds to step P310. Reception of a print job refers to the start of reception of a print job or the completion of reception of a print job.

In step P310, the printer 150 determines whether or not a predetermined time (for example, five minutes) has elapsed. If the predetermined time has elapsed, the process proceeds to step P312. Otherwise, the process returns to step P308. The predetermined time is a time that has elapsed since an address was transmitted in step S304.

In step P312, the printer 150 provides an indication that the predetermined time has elapsed but no print job has been received.

In step P314, the printer 150 stops the illumination of the visible-light communication LED light. Then, the process returns to step P302.

In step U308, a user operation is performed as follows. When the printer 150 provides an indication that the predetermined time has elapsed but no print job has been received (step P312 or P314), the user repeats the process from the beginning of the flow (e.g., step P302).

In step P316, the printer 150 stops the illumination of the visible-light communication LED light if a print job has been received. If a print job has been received, there is no longer need for light to be emitted. Thus, the printer 150 stops the emission of light to reduce power consumption. Stopping the emission of light allows the user of the mobile terminal 100 to be informed that the printer 150 has received the print job. This allows the user to find that the user may release the visible-light sensor from being exposed to visible light emitted from the printer 150 from which to print even if the mobile terminal 100 does not "provide an audio or visual indication or vibrate to indicate that the address of the printer 150 has been received via light". The completion of reception of a print job may be displayed on a console panel different from that for the visible-light communication LED light of the printer 150. However, stopping the illumination of the visible-light communication LED light would be more recognizable to the user, and, in addition, makes it no longer necessary to display information on the console panel. Also in step P314, the illumination is stopped. Whereas, in step P314, the illumination is stopped "after a predetermined time has elapsed", in step P316, the illumination is stopped "before a predetermined time has elapsed" (typically, immediately after an address and the like have been transmitted), which is also distinguishable to the user.

In step U310, a user operation is performed as follows. When the printer 150 stops the illumination of the visible-light communication LED light, the user moves the mobile terminal 100 to release the visible-light sensor of the mobile terminal 100 from being exposed to light emitted from the printer 150 from which to print.

In step P318, the operation performed by the printer 150 after the print job has been received via WiFi or the like is equivalent to an operation commonly performed after a print job has been received via WiFi. The printer 150 releases its low power consumption mode and enters a print mode. The printer 150 performs printing in accordance with the print job.

In step P320, the printer 150 enters the low power consumption mode after the printing operation. Then, the process returns to step P302.

On the other hand, the mobile terminal 100 performs the following process.

In step K302, an image file icon is selected by the user. No input is made for the selection of a printer.

In step K304, the mobile terminal 100 determines whether or not a "Start reception of address via visible-light communication" icon has been clicked on. If the "Start reception of address via visible-light communication" icon has been clicked on, the process proceeds to step K306. Otherwise, the mobile terminal 100 is placed on standby until the "Start reception of address via visible-light communication" icon has been clicked on.

In step K306, the mobile terminal 100 brings the visible-light sensor into a visible-light communication light receiving mode. The mobile terminal 100 starts receiving visible light based on the standard for visible-light communication.

In step U304, a user operation is performed as follows. The user positions the visible-light sensor of the mobile terminal 100 to be exposed to visible light emitted from the printer 150 from which to print.

In step K308, the mobile terminal 100 determines whether or not the visible-light sensor has received visible light based on the standard for visible-light communication. If the visible light has been received, the process proceeds to step K310. Otherwise, the mobile terminal 100 is placed on standby until light has been received.

In step K310, the mobile terminal 100 determines whether or not the received visible light includes the address of the printer 150. If the address of the printer 150 is included, the process proceeds to step K312. Otherwise, the process returns to step K308.

In step K312, the mobile terminal 100 releases the visible-light communication light receiving mode of the visible-light sensor and stops the operation of the visible-light sensor.

In step K314, the mobile terminal 100 produces an audio or visual indication, a vibration, or the like to indicate that the address of the printer 150 has been received via light.

In step U306, a user operation is performed as follows. When the mobile terminal 100 performs a "process for providing an indication that the address of the printer 150 has been received via light", the user moves the mobile terminal 100 to release the visible-light sensor from being exposed to visible light emitted from the printer 150 from which to print.

The operation of step K314 is optional. The operation of step K314 allows the user to be informed that the reception of the address of the printer 150 via light has been completed. This allows the user to understand when to release the mobile terminal 100 from being exposed to visible light emitted from the printer 150.

In step K316, the mobile terminal 100 creates a print job for printing the image file selected by the user.

In step K318, the mobile terminal 100 transmits the print job to the received address of the printer 150 by using wireless communication (such as WiFi). The print job may be transmitted by using communication other than WiFi. For example, Bluetooth may be used.

In step K320, the print job is transmitted from the mobile terminal 100 to the printer 150. Here, the print job is transmitted via wireless communication (such as WiFi). For example, a printing protocol or email may be used. The print job may also include additional information, namely, a user ID and a password.

In step K322, the mobile terminal 100 deletes the address or terminal name of the printer 150 received via visible-light communication from a memory. The operation of step K322 is optional.

Without the use of the technique of this exemplary embodiment (with the use of communication based only on WiFi as in the related art), it is necessary to set the address of the printer 150, which is the destination of the print job, in the mobile terminal 100 in advance, and this setting operation may be difficult for a user to perform in some cases. For this reason, the address of the printer 150, which is once set, is stored in a non-volatile memory and is re-used for the next transmission of a print job.

In this exemplary embodiment, the address of the destination printer 150 is readily receivable via visible-light communication. This eliminates the need to store the address of the printer 150, which is once received, and re-use it. The deletion of the address of the printer 150 prevents an unnecessary printer name from being stored in a printer selection list in the mobile terminal 100, making the printer selection list easier to see to the user, as well as preventing leakage of information related to the printer 150 (leading to improved security).

Figure 6:
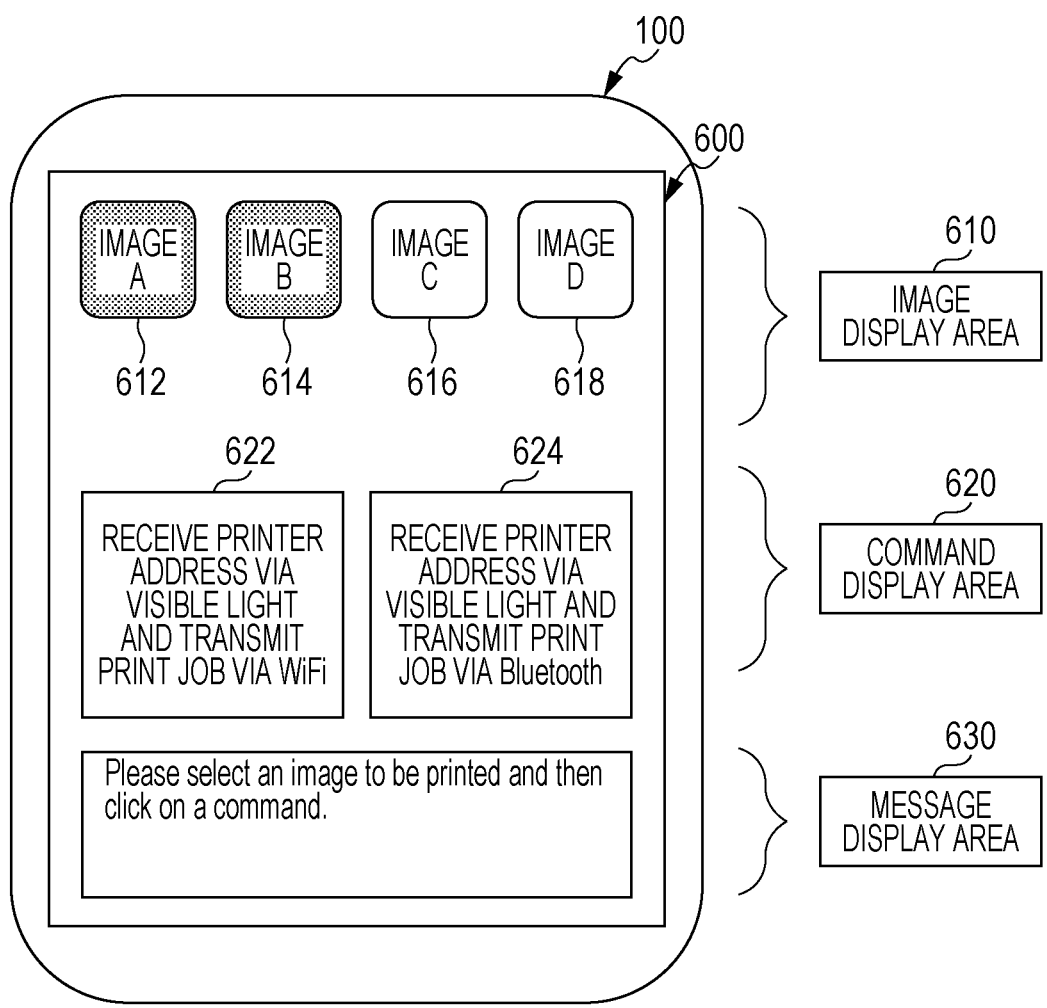
FIG. 6 illustrates an example process according to the exemplary embodiment.

FIG. 6 illustrates an example process (performed by the mobile terminal 100) according to this exemplary embodiment. Specifically, an example display corresponding to steps K302 and K304 in the flowchart is illustrated.

The mobile terminal 100 includes a display 600. In the example illustrated in FIG. 6, the content displayed on the display 600 is illustrated.

The display 600 has three areas: an image display area 610, a command display area 620, and a message display area 630.

The image display area 610 shows an "image A" icon 612, an "image B" icon 614, an "image C" icon 616, and an "image D" icon 618.

The command display area 620 shows a "Receive printer address via visible light and transmit print job via WiFi" icon 622 and a "Receive printer address via visible light and transmit print job via Bluetooth" icon 624.

The message display area 630 shows a message. For example, the message "Please select an image to be printed and then click on a command" is displayed in the message display area 630.

The example illustrated in FIG. 6 indicates that the "image A" icon 612 and the "image B" icon 614 have been selected. Thereafter, in response to a click on the "Receive printer address via visible light and transmit print job via WiFi" icon 622 or the "Receive printer address via visible light and transmit print job via Bluetooth" icon 624, a transition to "YES" in step K304 in the flowchart occurs.

Figure 7:
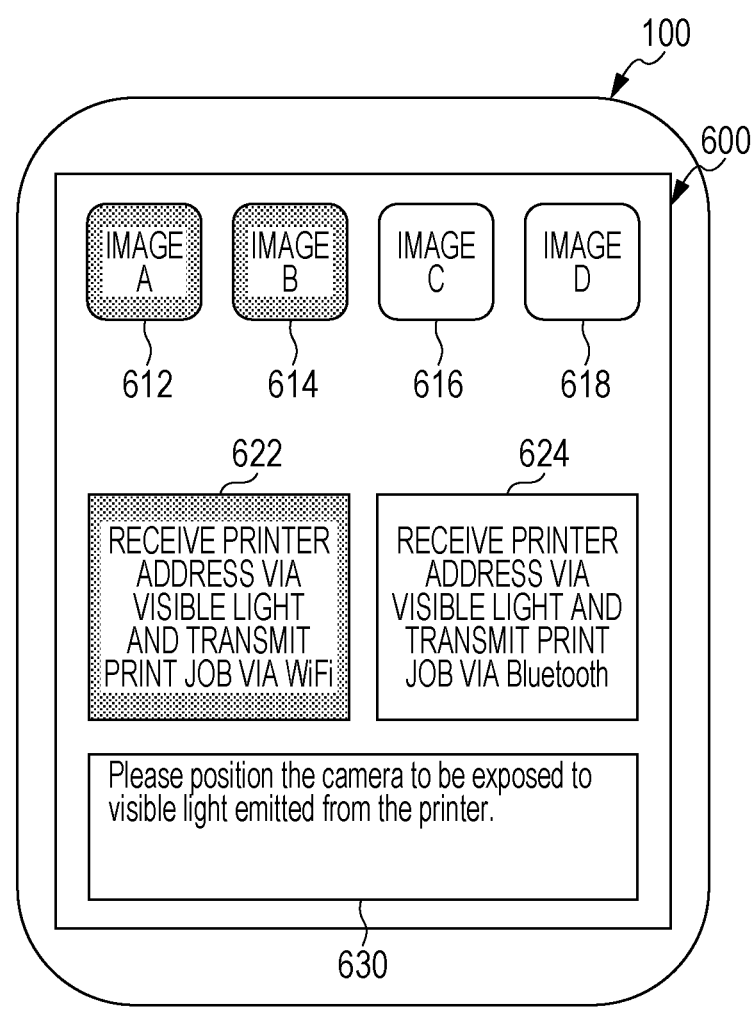
FIG. 7 illustrates an example process according to the exemplary embodiment.

FIG. 7 illustrates an example process (performed by the mobile terminal 100) according to this exemplary embodiment. Specifically, an example display corresponding to steps K306 and U304 in the flowchart is illustrated.

The "Receive printer address via visible light and transmit print job via WiFi" icon 622 is being selected by the user.

The message display area 630 shows, for example, the message "Please position the camera to be exposed to visible light emitted from the printer". The display of this message facilitates the user's understanding of the operation to be performed. The term "camera" as used here refers to the visible-light sensor. The user performs an operation of positioning the visible-light sensor to be exposed to visible light emitted from the printer 150 from which to print.

Figure 8:
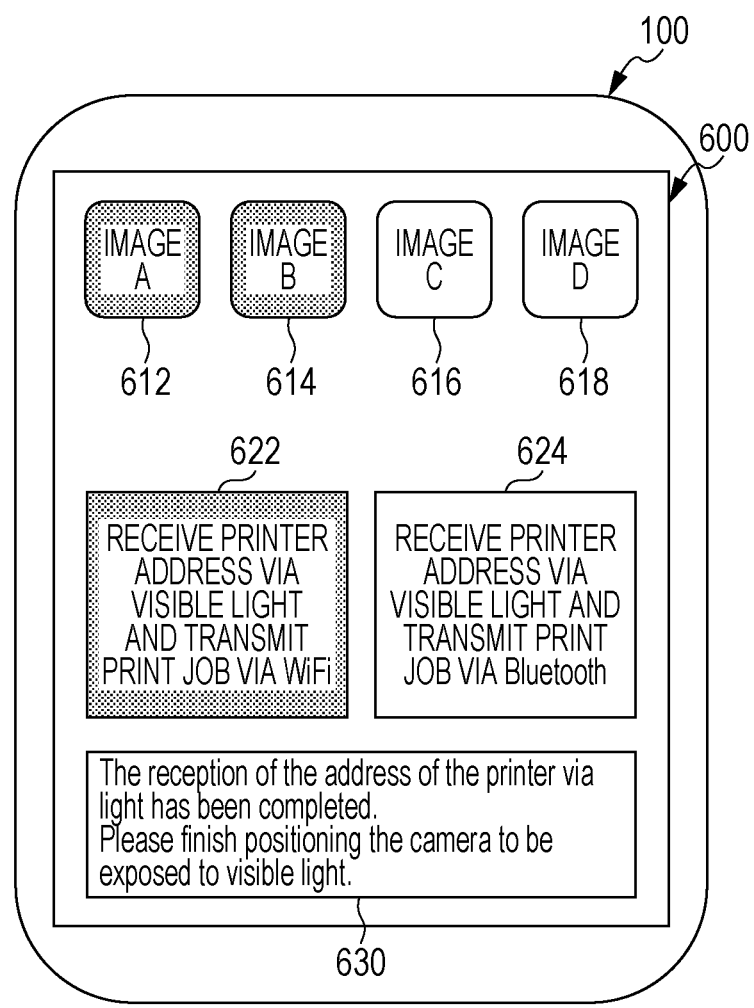
FIG. 8 illustrates an example process according to the exemplary embodiment.

FIG. 8 illustrates an example process (performed by the mobile terminal 100) according to this exemplary embodiment. Specifically, an example display corresponding to steps K308 to K314 and U306 in the flowchart is illustrated.

The "Receive printer address via visible light and transmit print job via WiFi" icon 622 is being selected by the user.

The message display area 630 shows, for example, the message "The reception of the address of the printer via light has been completed. Please finish positioning the camera to be exposed to visible light". The term "camera" as used here refers to the visible-light sensor.

When the reception of the address of the printer 150 via light has been completed, the operation to be performed by the user is displayed in the message display area 630. This display facilitates the user's understanding of the operation to be performed.

Figure 9:
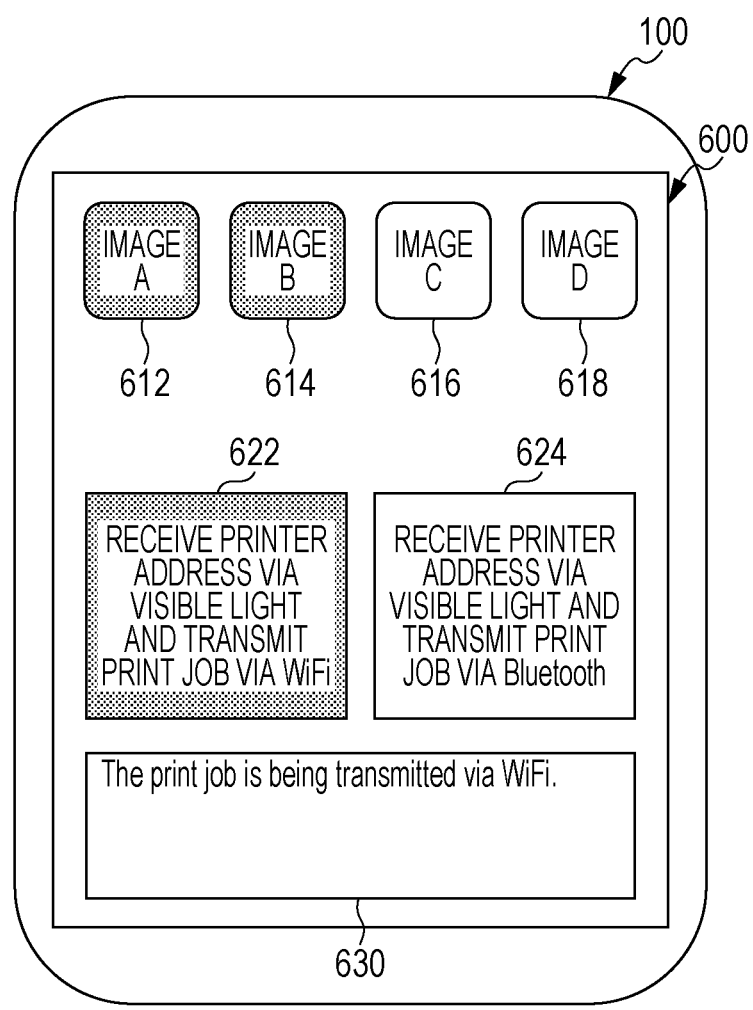
FIG. 9 illustrates an example process according to the exemplary embodiment.

FIG. 9 illustrates an example process (performed by the mobile terminal 100) according to this exemplary embodiment. Specifically, an example display corresponding to steps K316 and K318 in the flowchart is illustrated.

The "Receive printer address via visible light and transmit print job via WiFi" icon 622 is being selected by the user.

The message display area 630 shows, for example, the message "The print job is being transmitted via WiFi".

In the steps described above, the mobile terminal 100 transmits the print job to the received address of the printer 150 by using wireless communication (such as WiFi). When the "Receive printer address via visible light and transmit print job via Bluetooth" icon 624 is selected, the message "The print job is being transmitted via Bluetooth" is displayed.

Figure 10:
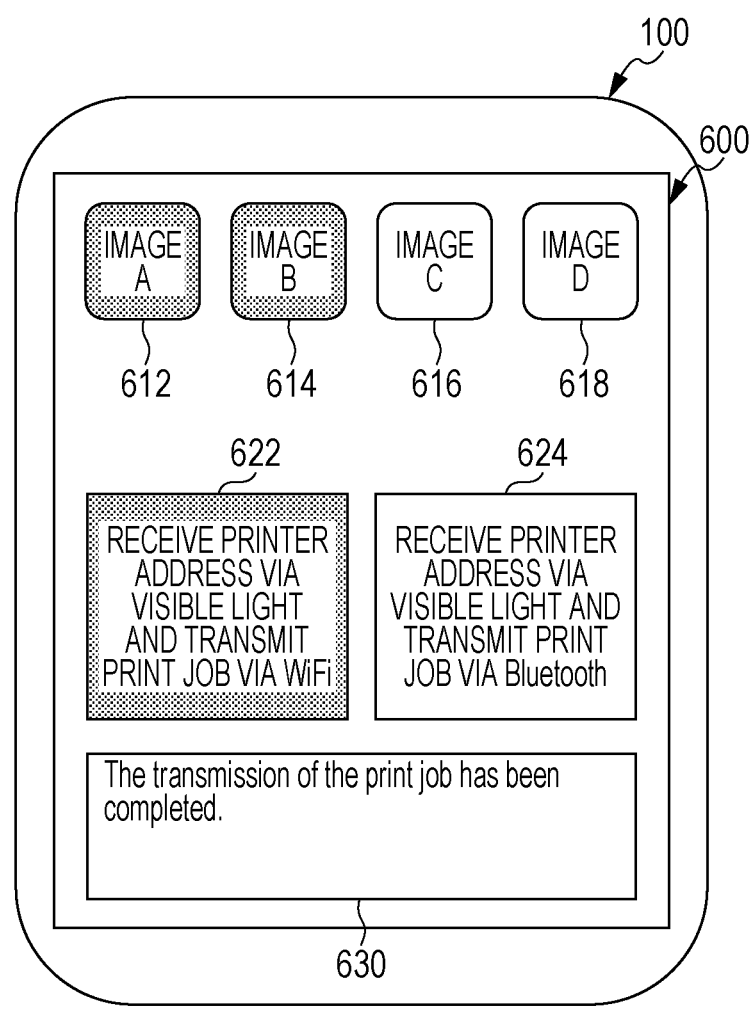
FIG. 10 illustrates an example process according to the exemplary embodiment.

FIG. 10 illustrates an example process (performed by the mobile terminal 100) according to this exemplary embodiment. Specifically, an example display corresponding to step K322 in the flowchart is illustrated.

The "Receive printer address via visible light and transmit print job via WiFi" icon 622 is being selected by the user.

The message display area 630 shows, for example, the message "The transmission of the print job has been completed". The user only waits for the print job to be printed from the printer 150.

Figure 11:
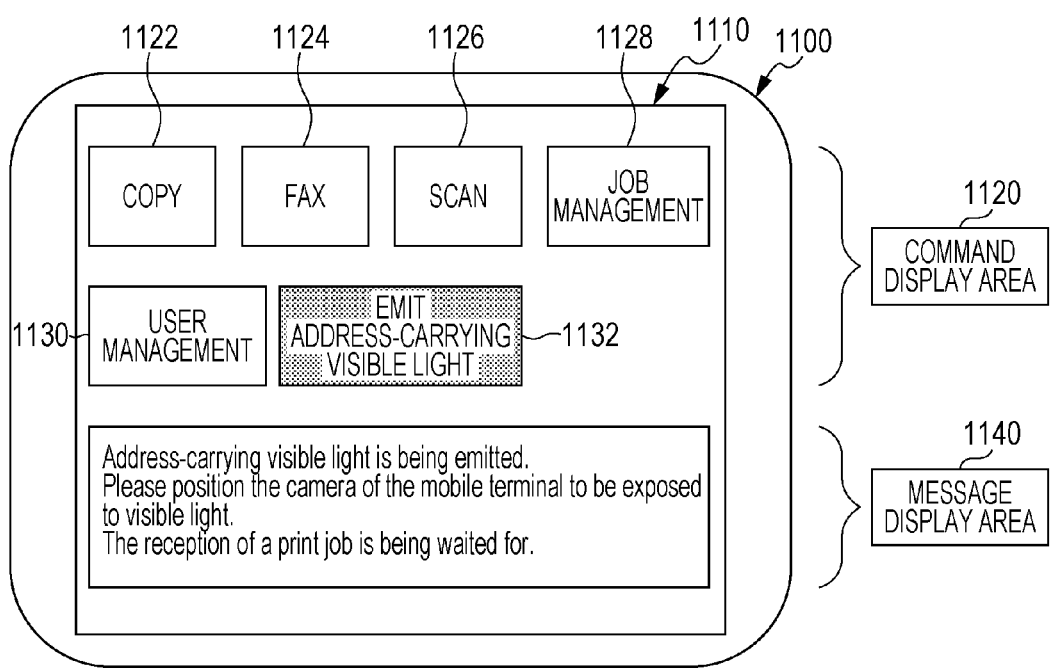
FIG. 11 illustrates an example process according to the exemplary embodiment.

FIG. 11 illustrates an example process (performed by the printer 150) according to this exemplary embodiment. Specifically, an example display corresponding to steps U302 and step P304 in the flowchart is illustrated.

A display device 1100 includes a display 1110.

The display 1110 has a command display area 1120 and a message display area 1140.

The command display area 1120 shows a "copy" icon 1122, a "fax" icon 1124, a "scan" icon 1126, a "job management" icon 1128, a "user management" icon 1130, and an "Emit address-carrying visible light" icon 1132.

The message display area 1140 shows a message.

The "Emit address-carrying visible light" icon 1132 is being selected by the user.

The message display area 1140 shows, for example, the message "Address-carrying visible light is being emitted. Please position the camera of the mobile terminal to be exposed to visible light. The reception of a print job is being waited for".

In the example illustrated in FIG. 11, a screen obtained after a visible-light communication start icon (corresponding to the "Emit address-carrying visible light" icon 1132) on the printer 150 has been selected is illustrated.

In the example in FIG. 11, the printer 150 emits light based on the standard for visible-light communication. The operation to be performed by the user is displayed in the message display area 1140. This display facilitates the user's understanding of the operation to be performed.

Figure 12:
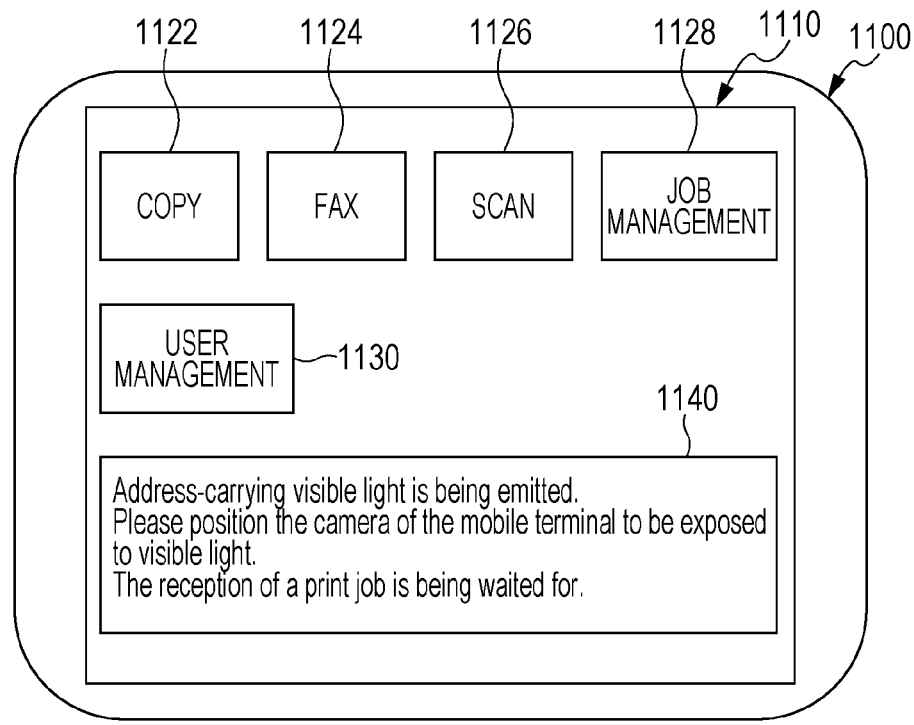
FIG. 12 illustrates an example process according to the exemplary embodiment.

FIG. 12 illustrates an example process (performed by the printer 150) according to this exemplary embodiment. Specifically, an example display corresponding to steps U302 and P304 in the flowchart (steps P1504 and P1604 described below with reference to an example illustrated in FIGS. 15 and 16, respectively) is illustrated. More specifically, an example display is illustrated in which when a person who is approaching the printer 150 is detected in the situation where the "Emit address-carrying visible light" icon 1132 is not displayed, the mobile terminal 100 emits light including instructions for emitting address-carrying light and the printer 150 receives the light.

The command display area 1120 shows the "copy" icon 1122, the "fax" icon 1124, the "scan" icon 1126, the "job management" icon 1128, and the "user management" icon 1130.

The message display area 1140 shows, for example, the message "Address-carrying visible light is being emitted. Please position the camera of the mobile terminal to be exposed to visible light. The reception of a print job is being waited for".

The "Emit address-carrying visible light" icon 1132 is not displayed when instruction that the printer 150 start visible-light communication is not necessary or when the printer 150 constantly emits light. While the printer 150 is emitting light based on the standard for visible-light communication, the operation to be performed by the user is displayed in the message display area 1140. This display facilitates the user's understanding of the operation to be performed.

Figure 13:
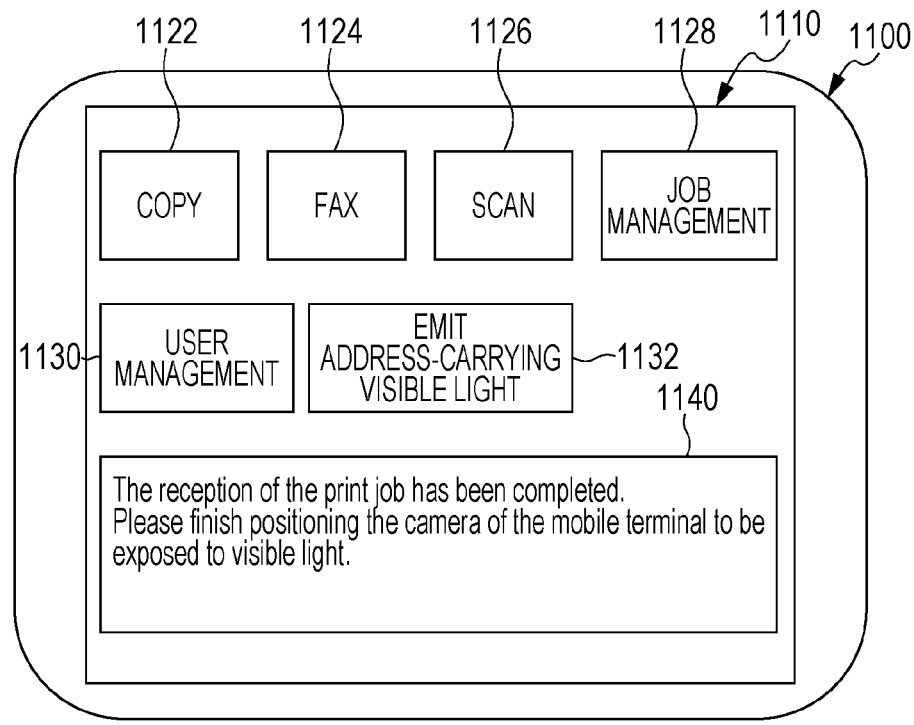
FIG. 13 illustrates an example process according to the exemplary embodiment.

FIG. 13 illustrates an example process (performed by the printer 150) according to this exemplary embodiment. Specifically, an example display corresponding to step P316 in the flowchart is illustrated.

The message display area 1140 shows, for example, the message "The reception of the print job has been completed. Please finish positioning the camera of the mobile terminal to be exposed to visible light".

When the reception of the print job is completed, the illumination of the visible-light communication LED light is stopped.

If the "Emit address-carrying visible light" icon 1132 is displayed, the state of the "Emit address-carrying visible light" icon 1132 is changed from the selected state to the original state (i.e., the unselected state).

The operation to be performed by the user is displayed in the message display area 1140. This display facilitates the user's understanding of the operation to be performed.

Figure 14:
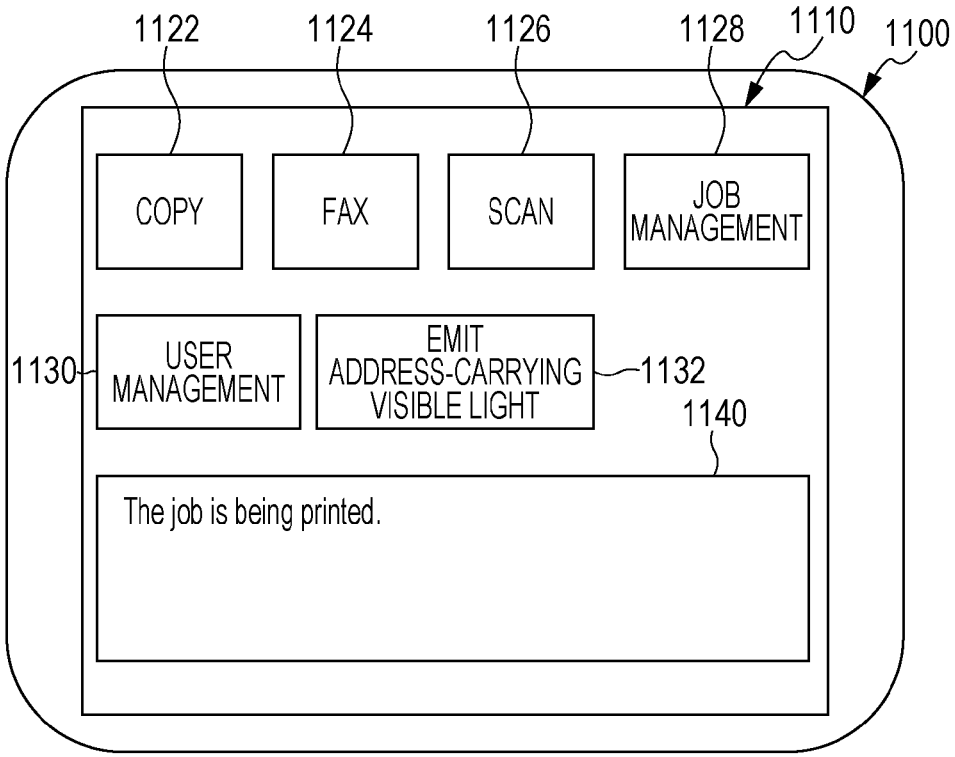
FIG. 14 illustrates an example process according to the exemplary embodiment.

FIG. 14 illustrates an example process (performed by the printer 150) according to this exemplary embodiment. Specifically, an example display corresponding to step P318 in the flowchart is illustrated.

The message display area 1140 shows, for example, the message "The job is being printed". This message indicates that printing is in progress in accordance with the print job. When the printing of the print job is completed, the message "The printing of the job has been completed" is displayed.

Figure 15:
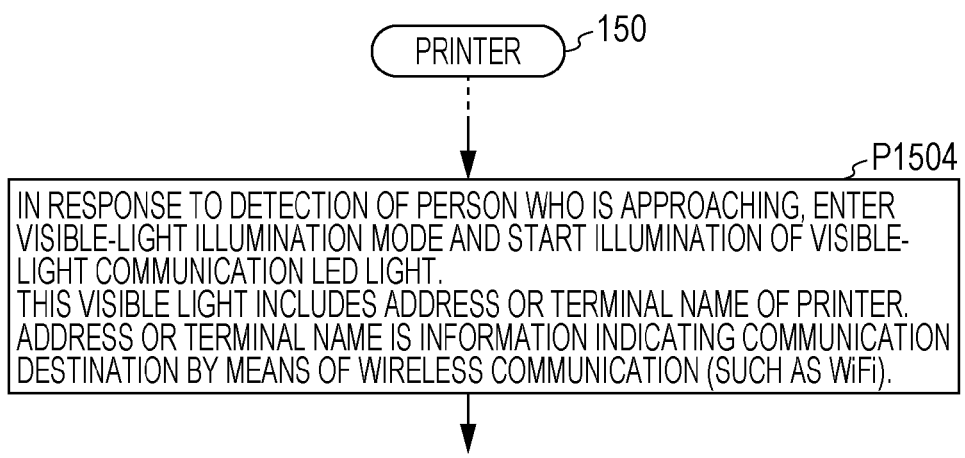
FIG. 15 is a flowchart illustrating another example process according to the exemplary embodiment.

FIG. 15 is a flowchart illustrating an example process according to this exemplary embodiment.

Step P304 in the flowchart illustrated by way of example in FIG. 3 may be replaced with step P1504 illustrated by way of example in FIG. 15.

In step P1504, in response to the detection of a person who is approaching the printer 150, the printer 150 enters the visible-light illumination mode and starts illumination of the visible-light communication LED light. The visible light includes the address or terminal name of the printer 150. The address or terminal name is information indicating a communication destination by means of wireless communication (such as WiFi). In this case, the switching operation performed by a person, as illustrated by way of example in FIG. 3, is not necessary.

In step P1504, furthermore, the visible-light communication LED light may be caused to illuminate only when visible-light communication is required (e.g., when a person approaches the printer 150) to reduce power consumption.

Figure 16:
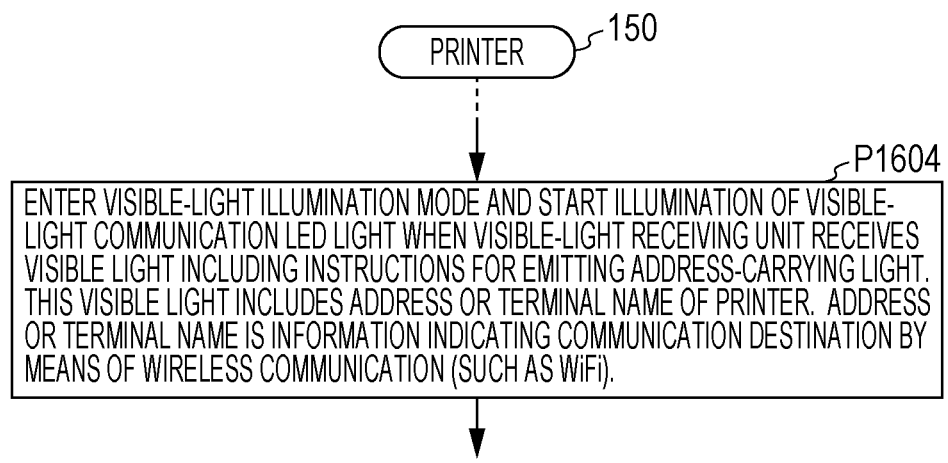
FIG. 16 is a flowchart illustrating another example process according to the exemplary embodiment.

FIG. 16 is a flowchart illustrating an example process according to this exemplary embodiment.

Step P304 in the flowchart illustrated by way of example in FIG. 3 may be replaced with step P1604 illustrated by way of example in FIG. 16.

In step P1604, the printer 150 enters the visible-light illumination mode and starts the illumination of the visible-light communication LED light when a visible-light receiving unit of the printer 150 receives visible light including instructions for emitting address-carrying light from the mobile terminal 100. The visible light includes the address or terminal name of the printer 150. The address or terminal name is information indicating a communication destination by means of wireless communication (such as WiFi). In this case, the switching operation performed by a person, as illustrated by way of example in FIG. 3, is not necessary. It is also not necessary to make a person approach the printer 150 as illustrated by way of example in FIG. 15. A person who is away from the printer 150 is able to perform the process illustrated by way of example in FIGS. 3 to 5 (or is able to transmit a print job).

In step P1604, furthermore, the visible-light communication LED light may be caused to illuminate only when visible-light communication is required (e.g., when visible light including instructions for emitting address-carrying light is received) to reduce power consumption.

Figure 17:
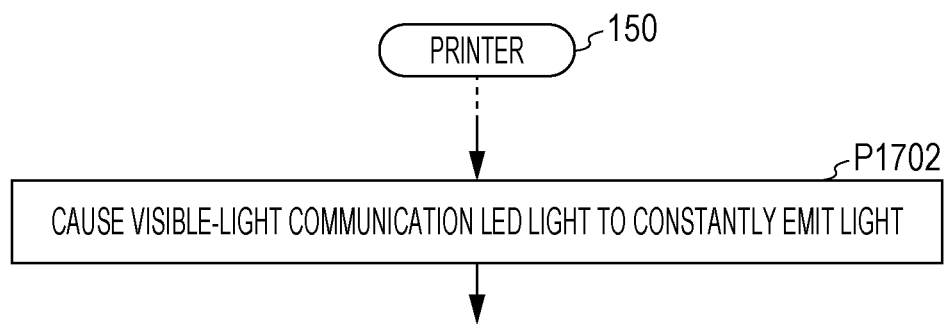
FIG. 17 is a flowchart illustrating another example process according to the exemplary embodiment.

FIG. 17 is a flowchart illustrating an example process according to this exemplary embodiment.

Steps P302 and P304 in the flowchart illustrated by way of example in FIG. 3 may be replaced with step P1702 illustrated by way of example in FIG. 17.

In step P1702, the visible-light communication LED light is caused to constantly emit light. The visible light includes the address or terminal name of the printer 150.

In this case, the switching operation performed by a person is not necessary, a person is able to transmit a print job without approaching the printer 150, or a process for emitting visible light including instructions for emitting address-carrying light from the mobile terminal 100 is not necessary. Power consumption is increased compared to when steps P302 and P304 or the like are employed, which is still acceptable.

Figure 18:
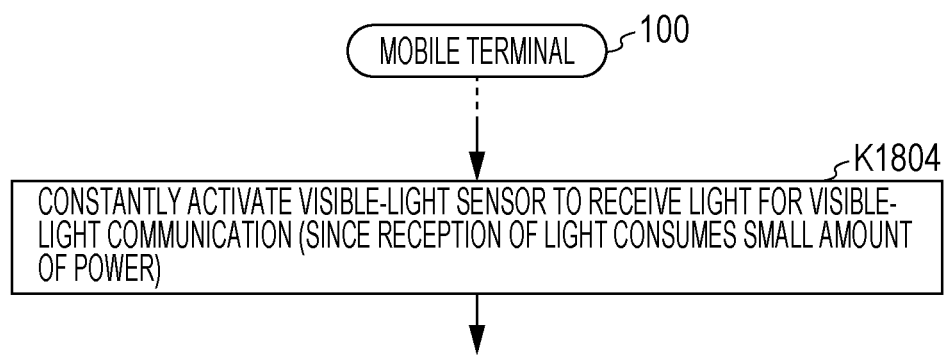
FIG. 18 is a flowchart illustrating another example process according to the exemplary embodiment.

FIG. 18 is a flowchart illustrating an example process according to this exemplary embodiment.

Steps K304 and K306 in the flowchart illustrated by way of example in FIG. 3 may be replaced with step K1804 illustrated by way of example in FIG. 18.

Steps K304 and K306 are those in the flow of starting receiving visible light after the "Start reception of address via visible-light communication" icon has been clicked on.

In step K1804, in contrast, the visible-light sensor is constantly activated to receive light for visible-light communication. Reception of light consumes a smaller amount of power than that for emission of light. In this case, it is no longer necessary to wait for the "Start reception of address via visible-light communication" icon (specifically, the "Receive printer address via visible light and transmit print job via WiFi" icon 622 or the "Receive printer address via visible light and transmit print job via Bluetooth" icon 624 illustrated by way of example in FIG. 6, etc.) to be clicked on. In other words, an operation for the user to "click on" the "Start reception of address via visible-light communication" icon is not necessary. The user is only required to select an image file icon and receive visible light emitted from the printer 150 by using the mobile terminal 100 to print the selected image file.

Figure 19:
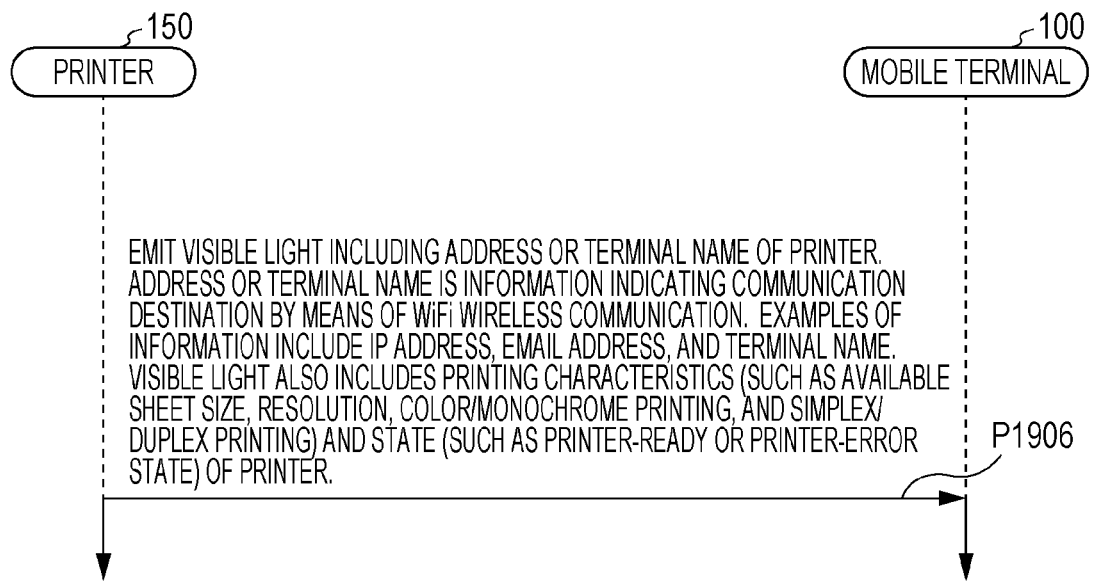
FIG. 19 is a flowchart illustrating another example process according to the exemplary embodiment.

FIG. 19 is a flowchart illustrating an example process according to this exemplary embodiment.

Step P306 in the flowchart illustrated by way of example in FIG. 3 may be replaced with step P1906 illustrated by way of example in FIG. 19.

In step P1906, the printer 150 emits visible light including the address or terminal name of the printer 150 to the mobile terminal 100. The address or terminal name is information indicating a communication destination by means of WiFi wireless communication. Examples of the information include an IP address, an email address, and a terminal name. The visible light may also include the printing characteristics of the printer 150 (such as an available sheet size, resolution, color/monochrome printing, and simplex/duplex printing) or the state of the printer 150 (such as the printer-ready or printer-error state).

Figure 20:
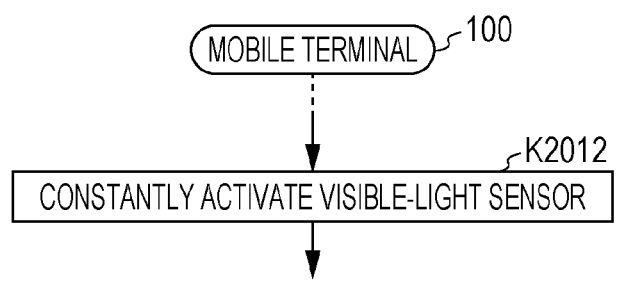
FIG. 20 is a flowchart illustrating another example process according to the exemplary embodiment.

FIG. 20 is a flowchart illustrating an example process according to this exemplary embodiment.

Step K312 in the flowchart illustrated by way of example in FIG. 4 may be replaced with step K2012 illustrated by way of example in FIG. 20.

In step K2012, the visible-light sensor is constantly activated.

In this case, the operation of "stopping the operation of the sensor" in step K312 is not necessary.

Figure 21:
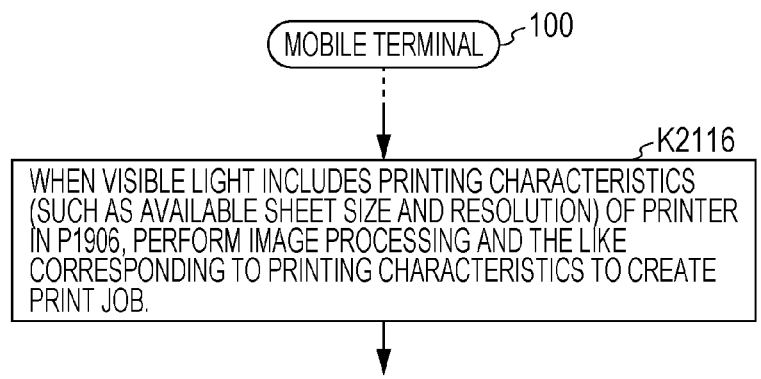
FIG. 21 is a flowchart illustrating another example process according to the exemplary embodiment.

FIG. 21 is a flowchart illustrating an example process according to this exemplary embodiment.

Step K316 in the flowchart illustrated by way of example in FIG. 4 may be replaced with step K2116 illustrated by way of example in FIG. 21.

In step K2116, when the visible light includes the printing characteristics of the printer 150 (such as an available sheet size and resolution) in step P1906, the mobile terminal 100 performs image processing and the like corresponding to the printing characteristics, such as providing an instruction to select a sheet, enlarging or reducing the size of an image, and performing conversion from a color image to a black-and-white, or monochrome, image, to create a print job.

Figure 22:
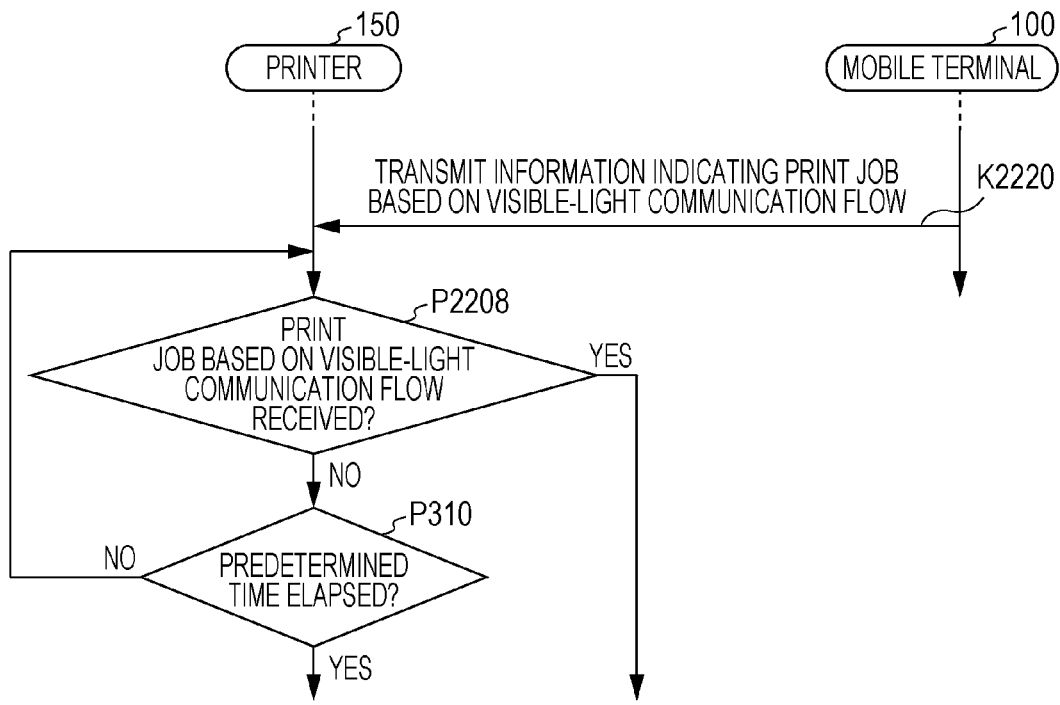
FIG. 22 is a flowchart illustrating another example process according to the exemplary embodiment.

FIG. 22 is a flowchart illustrating an example process according to this exemplary embodiment.

Step K320 in the flowchart illustrated by way of example in FIG. 4 may be replaced with step K2220 illustrated by way of example in FIG. 22, and step P308 in the flowchart illustrated by way of example in FIG. 4 may be replaced with step P2208 illustrated by way of example in FIG. 22.

In step K2220, communication from the mobile terminal 100 to the printer 150 is performed. The communication includes information indicating a print job based on the visible-light communication flow ("information indicating that the communication (the communication in step K2220) is being performed after receipt of the information for identifying the printer 150 via visible-light communication").

In step P2208, the printer 150 determines whether a print job based on the visible-light communication flow has been received. If the print job has been received, the process proceeds to step P316. Otherwise, the process proceeds to step P310.

In step P310, the printer 150 determines whether or not a predetermined time (for example, five minutes) has elapsed. If the predetermined time has elapsed, the process proceeds to step P312. Otherwise, the process returns to step P2208.

Without the process of step P2208, the printer 150 might stop the emission of light and terminate the flow even when a print job that is independent of the visible-light communication flow has been received via WiFi or the like, which causes the user to start the flow again.

With the process of step P2208, the printer 150 does not terminate the flow even when an irrelevant print job that has not undergone the visible-light communication flow has been received. The printer 150 waits until a print job based on the visible-light communication flow has been received. This allows the printer 150 to operate as expected by the user. While waiting for such a print job based on the visible-light communication flow to be received, the printer 150 may perform printing in accordance with an irrelevant print job that has not undergone the visible-light communication flow.

Figure 23:
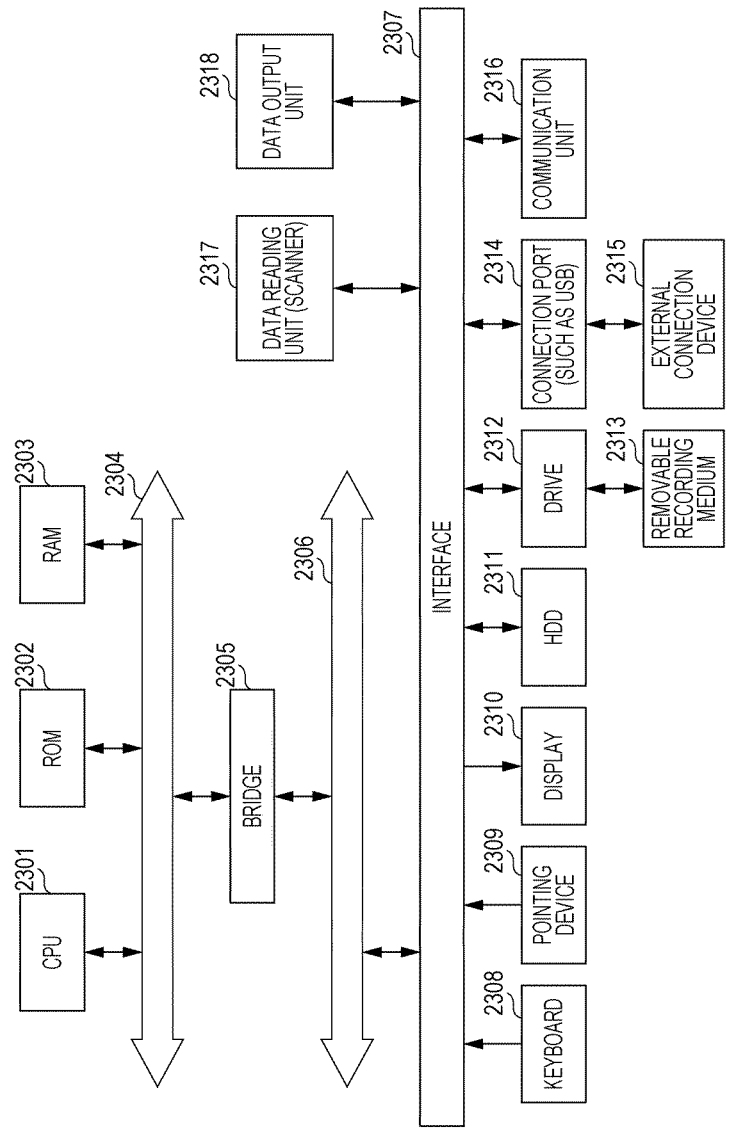
FIG. 23 is a block diagram illustrating an example hardware configuration of a computer that implements the exemplary embodiment.

An example hardware configuration of the mobile terminal 100 and the printer 150 according to this exemplary embodiment will be described with reference to FIG. 23. The configuration illustrated in FIG. 23 is implemented by a personal computer (PC), for example. An example hardware configuration including a data reading unit 2317, such as a scanner, and a data output unit 2318, such as a printer, is illustrated. The mobile terminal 100 may not include the data reading unit 2317 or the data output unit 2318.

A CPU 2301 is a controller that executes processing in accordance with a computer program describing the execution sequence of the various modules described in the foregoing exemplary embodiment, namely, the visible-light communication module 105, the communication module 110, the communication control module 115, the user interface module 120, the visible-light communication module 155, the communication module 160, the communication control module 165, the user interface module 170, the print control module 175, and the printing module 185.

A read-only memory (ROM) 2302 stores data used by the CPU 2301, such as programs and computation parameters. A RAM 2303 stores a program used in execution by the CPU 2301 and parameters and the like that change as appropriate in accordance with the execution of the program. The CPU 2301, the ROM 2302, and the RAM 2303 are connected to one another via a host bus 2304. The host bus 2304 is implemented as, for example, a CPU bus.

The host bus 2304 is connected to an external bus 2306 such as a Peripheral Component Interconnect/Interface (PCI) bus via a bridge 2305.

A keyboard 2308 and a pointing device 2309 such as a mouse are devices operable by an operator. A display 2310, examples of which include a liquid crystal display device and a cathode ray tube (CRT), displays various information as text and/or image information. Alternatively, the display 2310 may be a device having both the functions of the pointing device 2309 and the display 2310, such as a touch screen.

A hard disk drive (HDD) 2311 includes a built-in hard disk (or a flash memory or the like). The HDD 2311 drives the hard disk to record or reproduce information and a program to be executed by the CPU 2301. The hard disk implements the functions of the file storage module 125, the file storage module 180, and so on. In addition, other various data, various computer programs, and so on are also stored.

A drive 2312 reads data or a program recorded on a removable recording medium 2313 mounted on the drive 2312, such as a magnetic disk, an optical disk, a magneto-optical disk, or a semiconductor memory, and supplies the data or program to the RAM 2303 connected via an interface 2307, the external bus 2306, the bridge 2305, and the host bus 2304. The removable recording medium 2313 is also available as a data recording area.

A connection port 2314 is a port that connects an external connection device 2315, and has a connection part supporting a standard such as Universal Serial Bus (USB) or IEEE 1394. The connection port 2314 is connected to the CPU 2301 and so on via the interface 2307, the external bus 2306, the bridge 2305, the host bus 2304, etc. A communication unit 2316 is connected to a communication line to execute a process for data communication with external devices. Examples of the communication include, as described above, visible-light communication and wireless communication other than visible-light communication. The data reading unit 2317 may be a scanner, for example, and is configured to execute a process for reading documents. The data output unit 2318 may be a printer, for example, and is configured to execute a process for outputting document data.

The hardware configuration of the mobile terminal 100 and the printer 150 illustrated in FIG. 23 is an example configuration. The configuration of the exemplary embodiment described above is not limited to the configuration illustrated in FIG. 23 and may be any configuration that makes the modules described in the foregoing exemplary embodiment executable. For example, some of the modules may be implemented as dedicated hardware (such as an application specific integrated circuit (ASIC)), or some of the modules may be included in an external system and connected via a communication line. Alternatively, multiple systems each illustrated in FIG. 23 may be interconnected via a communication line so as to operate in cooperation with each other. In addition, the modules may be incorporated in a personal computer or any other device such as a mobile information communication device (such as a mobile phone, a smartphone, a mobile device, or a wearable computer), an information home appliance, a robot, a copier, a facsimile machine, a scanner, a printer, or a multifunction device (an image processing device having two or more functions among the functions of a scanner, a printer, a copier, a facsimile machine, and other suitable devices).

The program described above may be provided after being stored in a recording medium, or may be provided via a communication medium. In some exemplary embodiments, for example, the program described above may be embodied as a "computer-readable recording medium storing the program".

The term "computer-readable recording medium storing the program" refers to a recording medium readable on a computer having the program recorded thereon, which is used for purposes such as installation and execution of the program and distribution of the program.

Examples of the recording medium include digital versatile discs (DVDs), such as discs based on standards created by the DVD Forum, namely, "DVD-R, DVD-RW, and DVD-RAM", and discs based on standards created by the DVD+RW Alliance, namely, "DVD+R and DVD+RW", compact discs (CDs), such as a read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a ROM, an electrically erasable programmable ROM (EEPROM), a flash memory, a RAM, and a secure digital (SD) memory card.

All or part of the program described above may be recorded on the recording medium for storage or distribution, for example. Alternatively, all or part of the program described above may be transmitted via communication by using a transmission medium such as a wired network, a wireless communication network, or a combination thereof that is used for a communication architecture such as a LAN, a metropolitan area network (MAN), a wide area network (WAN), the Internet, an intranet, or an extranet, or may be carried on carrier waves.

Additionally, the program described above may be part or all of another program, or may be recorded on a recording medium together with individual programs. Alternatively, the program may be divided into pieces which are recoded on plural recording media. Moreover, the program may be recorded in any form that is restorable, such as in compressed or encrypted form.

The visible light for use in visible-light communication according to the exemplary embodiment described above may be diffused visible light, such as illumination of a ceiling light, or converging visible light, such as illumination of a flashlight. Converging visible light is easier for a user to use than diffused visible light since converging visible light is easier to apply only to the desired destination.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer comprising:
   a visible-light communication module configured to transmit to a mobile information processing device, via visible-light communication, information for identifying the printer as a destination for wireless communication; and
   a communication module configured to receive a print instruction from the mobile information processing device via the wireless communication in accordance with the information,
   wherein the visible-light communication module is configured to stop emission of light for the visible-light communication in response to receipt of the print instruction by the communication module.

2. The printer according to claim 1, further comprising a sensor configured to detect a person,
   wherein the visible-light communication module is configured to start the visible-light communication in response to detecting the person.

3. The printer according to claim 1, wherein the visible-light communication module is configured to start the visible-light communication in response to receipt of an instruction for transmitting the information for identifying the printer from the mobile information processing device via the visible-light communication.

4. The printer according to claim 1, wherein the visible-light communication module is configured to transmit a characteristic of the printer or a state of the printer via the visible-light communication.

5. The printer according to claim 1, further comprising at least one processor configured to control to perform printing in accordance with the print instruction in response to receipt of, together with the print instruction, information indicating that the wireless communication is being performed after receipt of the information for identifying the printer via the visible-light communication.

6. The printer according to claim 1, further comprising a user interface configured to provide a suggestion to a user to perform an operation of positioning the mobile information processing device to allow visible light to reach the mobile information processing device when transmission is to be performed via the visible-light communication.

7. The printer according to claim 1, further comprising at least one processor configured to perform control:
   to stop transmitting the visible-light communication in response to receipt of, together with the print instruction, information indicating that the wireless communication is being performed after receipt of the information for identifying the printer via the visible-light communication, and
   not to stop transmitting the visible-light communication in response to the information indicating that the wireless communication is being performed after receipt of the information for identifying the printer via the visible-light communication not being received together with the print instruction.

8. The printer according to claim 1, further comprising a user interface configured to in response to the print instruction not being received within a predetermined time, cause an operation related to the visible-light communication to stop and provide an indication that no print instruction has been received.

9. A non-transitory computer readable medium storing a program causing a computer to execute a process for printing, the process comprising:
   transmitting to a mobile information processing device, via visible-light communication, information for identifying a printer as a destination for wireless communication;
   receiving a print instruction from the mobile information processing device via the wireless communication in accordance with the information; and stopping emission of light for the visible-light communication in response to receipt of the print instruction.

10. A printer comprising:
a visible-light communication module configured to transmit to a mobile information processing device, via visible-light communication, information for identifying the printer as a destination for wireless communication different from the visible-light communication;
a communication module configured to receive a print instruction from the mobile information processing device via the wireless communication in accordance with the information; and
a user interface configured to provide a suggestion to a user to perform an operation of positioning the mobile information processing device to allow visible light emitted from the printer to reach the mobile information processing device when transmission is to be performed via the visible-light communication.

11. An image output method comprising:
transmitting to a mobile information processing device, via visible-light communication, information for identifying a printer as a destination for wireless communication;
receiving a print instruction from the mobile information processing device via the wireless communication in accordance with the information; and
stopping emission of light for the visible-light communication in response to receipt of the print instruction.

* * * * *